United States Patent [19]

McGinnis et al.

[11] Patent Number: 4,520,223

[45] Date of Patent: May 28, 1985

[54] DEHYDROGENATION PROCESS

[75] Inventors: Roger N. McGinnis; Lewis E. Drehman; Emory W. Pitzer, all of Bartlesville, Okla.

[73] Assignee: Phillips Petroleum Company, Bartlesville, Okla.

[21] Appl. No.: 540,598

[22] Filed: Oct. 11, 1983

Related U.S. Application Data

[62] Division of Ser. No. 379,804, May 19, 1982, Pat. No. 4,431,750.

[51] Int. Cl.$^3$ .............. C07C 5/333; C07C 5/32; C07C 5/02; C10G 35/04
[52] U.S. Cl. .................. 585/629; 585/660; 585/661; 208/138
[58] Field of Search ............ 585/629, 660, 661; 208/138

[56] References Cited

U.S. PATENT DOCUMENTS

| | | | |
|---|---|---|---|
| 3,210,296 | 10/1965 | Gray | 252/466 PT |
| 3,535,402 | 10/1970 | Kluksdahl | 585/660 |
| 3,576,766 | 4/1971 | Rausch | 585/660 |
| 3,668,151 | 6/1972 | Walker | 252/466 |
| 3,880,776 | 4/1975 | Box, Jr. | 252/466 PT |
| 3,903,191 | 9/1975 | Pollitzer | 585/660 |
| 3,932,309 | 1/1976 | Graham et al. | 252/439 |
| 4,013,733 | 3/1977 | Rausch | 585/660 |
| 4,154,812 | 5/1979 | Sanchez et al. | 423/626 |
| 4,341,664 | 7/1982 | Antos | 252/466 PT |
| 4,370,260 | 1/1983 | Kim | 252/466 PT |
| 4,431,750 | 2/1984 | McGinnis et al. | 502/329 |

*Primary Examiner*—Delbert E. Gantz
*Assistant Examiner*—Chung K. Pak

[57] ABSTRACT

Platinum or other platinum-group metals can be deposited substantially on the surface only of pellets of a refractory catalyst support by impregnation with an aqueous solution of such as hexammonium platinum tetrasulfite. The resulting catalysts contain relatively small total amounts of platinum-group metal positioned primarily at the surface, yet are as highly active as catalysts uniformly impregnated throughout the body of the pellet and containing much larger amounts of platinum-group metal. The catalyst further can contain rhenium.

28 Claims, No Drawings

DEHYDROGENATION PROCESS

This is a divisional application of Ser. No. 379,804 filed May 19, 1982, now U.S. Pat. No. 4,431,750 issued Feb. 14, 1984.

FIELD OF THE INVENTION

The invention pertains to supported noble metal catalysts. In another aspect, the invention pertains to methods for the preparation of supported noble metal catalysts having the noble metal impregnated substantially at the surface. In another aspect, the invention pertains to hydrocarbon conversion processes using the novel supported noble metal catalysts.

BACKGROUND OF THE INVENTION

Noble metal catalysts supported on a variety of porous supports have been used in the many processes, such as hydrogenation, dehydrogenation, cyclization, and various hydrocarbon conversion processes.

In general, the supported noble metal catalysts have been prepared by a variety of means such as coprecipitation with the support such as alumina, followed by washing, drying, calcining. Alternatively, the support is first formed in any of a variety of shapes, and the porous support then impregnated with an aqueous solution of a noble metal compound, such as chloroplatinic acid, and the resulting composite dried, and calcined. Other methods of impregnation have been employed, other than aqueous impregnation, such as the use of nonaqueous media.

The art methods have provided highly effective catalysts, though these catalysts in general have been a product in which only a portion of the catalysts, that is, the noble metal, has been available for active duty. The active portion of the noble metal normally is that which is on the surface. Noble metal which is deep inside the support is substantially wasted. As costs of noble metals have increased, so have costs of the catalysts. Needed are methods of providing highly active catalysts with only fractional contents of noble metal, yet which will exhibit sufficient activity. Most vitally needed are supported noble metal catalysts in which substantially all of the noble metal is at the surface, available for active participation in the catalytic processes, and not otherwise being wasted by being buried in the body of the catalysts.

BRIEF SUMMARY OF THE INVENTION

We have discovered novel noble metal catalysts and a novel method for preparing them which comprises depositing a noble metal on the outermost layer of catalyst support pellet, using aqueous solutions of a noble metal sulfite compound.

For hydrocarbon conversion processes generally, and particularly for those diffusion limited processes, only the outer layer of the catalyst is of importance. Any noble metal inside the catalyst support is substantially wasted and of no benefit. By depositing noble metal at or near the surface of the catalyst support, the noble metal is used most efficiently. Far less expensive noble metal is needed for catalyst preparation, representing a significant savings in noble metal supported catalyst costs.

We have found that a porous refractory catalyst support can be treated by impregnation with an aqueous solution of a noble metal sulfite.

For example, steam-active platinum-based reforming catalysts can be prepared using an impregnating solution of hexammonium platinum tetrasulfite $(NH_4)_6Pt(SO_3)_4$ to impregnate the presently preferred $SnO/ZnAl_2O_4$ support. Optionally, and preferably, the support pellets are presoaked in water or liquids miscible with water, such as methanol, isopropanol, or ethylene glycol, before impregnation, providing an even thinner layer of highly active platinum or other noble metal.

DETAILED DESCRIPTION OF THE INVENTION

We have discovered novel supported noble metal catalysts, and novel methods for preparing supported noble metal catalysts, as well as hydrocarbon conversion processes using our catalysts. These catalysts comprise a noble metal at or near the surface of a support pellet. These catalysts are prepared by impregnating a porous support with an aqueous solution of the noble metal sulfite compound, wherein said aqueous solution uses salts of noble metal sulfites having the general formula $A_6M(SO_3)_4$ where A is $NH_4+$ or a member of Group IA of the Periodic Table and is any of lithium, sodium, potassium, rubidium, or cesium, and M is any of Ru, Rh, Pd, Os, Ir, or Pt. Mixtures of course can be used.

Optionally, the supports are first presoaked in water or liquids miscible with water, such as methanol, isopropanol, or ethylene glycol, prior to impregnation with the noble metal sulfite compound solutions. This novel method provides novel catalysts in which the noble metal is positioned as a relatively thin layer on, at, or very near the surface of the support, with very little noble metal involved in the interior portions of the support. Hence, highly active noble metal catalysts are provided in which the total content of noble metal is less than that normally heretofore required, since substantially all is available for active catalyst participation in hydrocarbon conversion processes.

NOBLE METALS

The process of our invention, and the resulting catalysts, are provided by any one or more of the noble metals of the platinum family of Group VIII of the Periodic Table of the Elements. These noble metals applicable to our invention include platinum, iridium, osmium, palladium, rhodium, and ruthenium, any one of these, or any mixture thereof optionally with a compound of rhenium such as ammonium perrhenate or perrhenic acid.

Presently preferred for effectiveness is platinum. Platinum by far is the most widely used metal of this group in catalytic processes, though the others are also of known effectiveness and the usefulness thereof can be improved in accordance with our invention. In our discussion hereinafter, we may frequently refer to a platinum-containing catalyst, or the use of certain platinum salts, compounds, or solutions. However, it is to be understood that our catalysts, and the method of preparing them, and the applicability of the catalysts, refer equally to the other noble metals of Group VIII as hereinbefore discussed, optionally with rhenium.

SUPPORT

Supports useful in the application of our invention are any of the solid porous high surface area supports of refractory nature known to the catalytic arts as supports for noble metal catalysts.

Such supports can be selected from among the various aluminas, titania, zirconia, magnesia, thoria, chromia, zinc titanate, zinc aluminate, $SnO/ZnAl_2O_4$, any of these alone, or in admixture.

Presently preferred is a support comprising zinc aluminate which may be prepared by calcining mixtures of finely divided alumina and zinc oxide at a suitable temperature as disclosed in U.S. Pat. No. 3,668,151 (column 1, line 36 to column 2, line 9). The atomic ratio of Zn:Al in suitable zinc aluminate preferably will be in the range of about 0.5–0.53, preferably about 0.50 to 0.505.

Our invention applies primarily to catalysts of sufficient particles size that they do not present excessive resistance to the flow of liquids. Such particles will range upward in size from about ⅛" pellets, spheres, or cata-aggregates of equal volume.

Typically $SnO/ZnAl_2O_4$, a presently preferred support for butane dehydrogenation, can be prepared by combining the component oxides in a suitable ratio and calcining to produce zinc alumina spinel containing tin oxide. A suitable $ZnO:Al_2O_3$ ratio is from about 0.5 to 0.53:1; a concentration of about one percent tin as the oxide in the calcined product is preferred. Alternatively, zinc oxide and alumina in the appropriate ratio can be combined and calcined to form zinc aluminate; and the product then impregnated with sufficient tin chloride, e.g., stannous chloride, to produce, after drying and calcining, the desired compositions.

IMPREGNATION PROCEDURES

The supports as described hereinebefore are treated in our invention with a sulfite compound of the noble metal as described hereinbefore using an aqueous solution that is about 0.001 molar to saturated, preferably about 0.01 to 0.05 molar. The presently preferred species for availability and convenience is $(NH_4)_6Pt(SO_3)_4$. Multiple impregnations, with drying to remove solvent between the steps can be used if the solubility of the compound is not large enough. Impregnation is conducted by treating the selected support with the aqueous solution of the platinum sulfite compound at temperatures in the range of about the freezing point to the boiling point of the solution; usually a temperature between about 10° C. to 50° C. is suitable and convenient. Impregnation can be effected at any suitable pressure; generally atmospheric pressure is satisfactory and convenient. Time of impregnation can range such as 1 to 1000 seconds, or longer. Usually about 5 to 100 seconds is suitable and convenient. The method of incipient wetness, wherein the catalyst particle imbibes a sufficient volume of liquid to just fill its pores and thereafter the metal compound is adsorbed on the skin of the pellet, can be used.

After impregnation, the treated catalyst is dried to remove solvent, e.g. by warming to such as about 50° C. to 125° C., and finally heated at an elevated temperature at which the treating compound is decomposed. A temperature of about 200° C. to 600° C. is suitable. An oxidizing, reducing, or inert atmosphere can be used for the decomposition step, such as air, CO or $H_2$, $N_2$. Subsequent additional treatment may be required before the catalyst is used.

For example, catalysts that are to be used for hydrogenation or hydrocracking processes are advantageously treated with such as hydrogen, preferably, at elevated temperatures, before being placed into service.

As discussed hereinbefore, a presently preferred procedure is termed the incipient wetness procedure. In this procedure we presoak the selected support pellets in water, preferably demineralized, or a water miscible liquid, such as methanol, isopropanol, or ethylene glycol, for about 10 minutes to 100 minutes or longer, at a temperature of about 0° C. to 100° C. Conveniently, ambient temperature is suitable.

Thereafter, the presoaked moist support then is treated with the aforesaid noble metal sulfite compound solution as hereinbefore described.

IMPREGNATED SUPPORTED NOBLE METAL CATALYSTS

The impregnated supported noble metal catalysts can contain any suitable and effective range of noble metal as may be desired for particular end purposes and catalyst applications. Broadly, we suggest a range of about 0.0001 to 10 or more, more typically about 0.1 to 1, weight percent noble metal. In the option using Re, these values represent the total noble metal plus rhenium, which latter can represent up to about half the total. Of course, the actual amount of noble metal, of the total catalyst including support, can vary considerably, depending upon the particular purpose for which the supported noble metal catalyst is to be employed, since our catalysts are applicable to a wide variety of hydrogenation, dehydrogenation, cyclization, and a variety of other hydrogenation conversion processes. Presently preferred is the employment of these catalysts in such as butane dehydrogenation.

ANALYSIS

The following procedure can be employed to determine the extent of surface presence of the noble metal as opposed to presence of the noble metal throughout the catalyst support.

The thickness of the metal layer produced by the impregnation procedure described is conveniently determined in catalyst particles after they have been dried, e.g. for one hour at 120° C., then heated in flowing hydrogen at 600° C. to reduce the metal, and finally cutting the particle to observe a section of the impregnated layer. For precise determination of the thickness of the impregnated layer, use of a microscope is generally required; typical layers may be only a fraction of a millimeter.

HYDROCARBON CONVERSION PROCESSES

The noble metal supported catalysts prepared by our method are suitable for use in a wide variety of chemical and petroleum processes including hydrogenation, hydrocracking, oxidation, cyclization, dehydrogenation, isomerization, and the like. These supported noble metal catalysts prepared by our invention are particularly suitable for the dehydrogenation of alkanes, particularly those alkanes of propane to $C_{10}H_{22}$, preferably $C_4H_{10}$–$C_5H_{12}$, most preferably butane to provide butenes and butadiene.

For example, to dehydrogenate butane the temperature can range from about 480° C. to 650° C. preferably 550° C. to 607° C. Suitable pressures are between about 0 to 300 psig; preferably about 40 to 120 psig. Suitable hydrocarbon feed rates expressed as volumes of gaseous feed per volume of catalyst, per hour (GHSV) are from about 100 to 10,000, preferably about 500 to 2000. With the preferred platinum/tin oxide/zincaluminate catalyst it is desirable to use a mixture of steam and hydrocarbon for feedstock. Suitable steam:hydrocarbon mole ratios are about 2 to 30, preferably about 3 to 12.

EXAMPLES

Examples following are intended to further assist one skilled in the art to an understanding of our invention. Examples given, reactants, conditions, are intended to be further exemplary, and not limitative of the reasonable scope of the invention.

EXAMPLE I

The support employed in the comparative runs was a $SnO/ZnAl_2O_4$. Zinc aluminate was prepared by combining French process zinc oxide and flame hydrolyzed alumina in the ratio 48.23 lb. $ZnO/51.21$ lb. $Al_2O_3$. After thorough mixing, sufficient water was added to form an extrudable mixture. After extrusion, the material was dried for 6 hours at 120° C. The dried extrudate was calcined in air according to the following schedule: heat to 538° C. in two hours, hold at that temperature for two hours, increase the temperature to 871° C. in two hours, hold at that temperature for three hours, then cool. After determining the pore volume of the calcined zinc aluminate by the method of incipient wetness, 1.90 lb. $SnCl_2.2H_2O$ were dissolved in the volume of water representing its absorption capacity. "Absorption Capacity" is synonymous with "Pore Volume". The solution was sprayed onto the granules with an atomizer. After drying as above, the impregnated preparation was heated in air to 593° C. in two hours and held at that temperature for two additional hours.

EXAMPLE II

About 5 cc of a 0.023 M aqueous solution of chloroplatinic acid was poured onto 0.5 g of $SnO/ZnAl_2O_4$ ⅛ inch cylindrical catalyst pellets. After about one minute the solution was poured off. The pellets were dried one hour at about 120° C. The pellets were calcined one hour at 600° C. The pellets were heated to 600° C. in flowing hydrogen for about 30 minutes to visualize the platinum. The pellets were cut in half and platinum was observed by its dark color to be uniformly distributed throughout the catalyst pellets.

Pretreatment of the support pellets by presoaking in water prior to treatment with the chloroplatinic acid gave the same result.

EXAMPLE III

Aqueous solutions of $(NH_4)_6Pt(SO_3)_4$ were impregnated onto the $SnO/ZnAl_2O_4$ catalyst base as described in Example II above.

| $(NH_4)_6Pt(SO_3)_4$ Conc. | Presoak | Impregnation Time | % Catalyst Containing Pt[a] |
|---|---|---|---|
| 0.023 M | No | 15 seconds | 37.7% |
| 0.023 M | No | 1 minute | 47.2% |
| 0.023 M | Yes | 1 minute | 28.7% |
| 0.023 M | No | 25 minutes | 69.5% |

[a]Values in the final column of this tabulation were calculated from measurement of the thickness of the impregnated layer from photomicrographs of sections of treated pellets.

Presoaking the support pellets in water prior to treatment with the noble metal sulfite gave a thinner layer of platinum than without the presoak (incipient wetness) mode.

EXAMPLE IV

About 50 cc of a 0.023 M aqueous solution of $(NH_4)_6Pt(SO_3)_4$ was poured onto 40 g of $SnO/ZnAl_2O_4$ support pellets. The catalyst was then treated as in Example II above. The platinum was found to be in the outer 47 percent of the catalyst pellet. Analysis showed that the catalyst contained 0.25 weight percent Pt.

The so-prepared catalyst was tested in ability to dehydrogenate n-butane at 1104° F. at 100 psig in two twelve hour process cycles. The control was a previously prepared catalyst uniformly impregnated with platinum and containing 0.6 weight percent platinum. Results are as follows:

| Preparation | Invention | Control |
|---|---|---|
| Wt. % Pt | 0.25 | 0.6 |
| Skin depth -mm | 0.35 | All |
| Vol. % Impregnated | 52.6 | 100.0 |
| Activity Index | 0.27 | 0.23 |
| Stability Index | 0.61 | 0.49 |

The Activity Index is obtained by measuring dehydrogenation after one, six and 11 hours on stream, fitting an empirical curve to the three data points and extrapolating back to time zero. The result is compared to a standard platinum/tin oxide/zinc aluminate 20-40 mesh catalyst. One-eighth inch particles of the invention runs are inherently less active than 20-40 mesh particles because of diffusion limitations. The Stability Index is also referenced against an arbitrary standard. It measures the decrease in activity between that calculated for time zero and that observed after 11 hours on stream. Larger numbers indicate higher catalyst stability; i.e., surface impregnated catalyst containing 0.25 weight percent Pt was more stable than the uniformly impregnated composition containing 0.6 weight percent Pt.

What is significant is that the catalyst of the invention prepared by skin impregnation and containing only 0.25 weight percent on its periphery was equivalent in activity to one containing 0.6 weight percent platinum as the control in which the platinum was substantially uniformly distributed throughout the body of the catalyst.

The disclosure, including data, has illustrated the value and effectiveness of our invention. The examples, the knowledge and background of the field of the invention and of general principles of chemistry and the catalytic arts in hydrocarbon conversion arts, as well as other applicable sciences, have formed the basis to which the broad descriptions of our invention, including the ranges of conditions and generic groups of operative components have been developed, and thus have formed the basis for our claims here appended.

We claim:

1. A process for dehydrogenation of alkanes which comprises contacting at least one alkane under dehydrogenation conditions with a supported platinum-group metal catalyst wherein said platinum-group metal is deposited substantially toward the surface of said support and prepared by the process which comprises:
    (a) impregnating a porous support with an aqueous solution of a platinum-group metal sulfite and a rhenium compound wherein said platinum-group metal is at least one of platinum, iridium, osmium, palladium, rhodium, and ruthenium,
    (b) drying the thus-prepared composite, and (c) heating the thus-dried composite at a temperature sufficient to decompose said sulfite, thereby producing said supported platinum-group metal catalyst.

2. A process according to claim 1 wherein said platinum-group metal sulfite is represented by the formula $A_6M(SO_3)_4$ wherein A is ammonium or a member of Group IA of the Periodic Table, and M is a said platinum-group metal.

3. A process according to claim 2 wherein said (a) impregnating step is conducted by treating said support with an aqueous solution of said platinum-group metal sulfite at temperatures of about 10° C. to 50° C., for a time of about 1 to 1000 seconds, employing a concentration of aqueous solution of said platinum-group metal sulfite sufficient to achieve about 0.0001 to 10 weight percent total of said platinum-group metal and rhenium in the resulting supported platinium-group metal catalyst; said (b) drying step is conducted at a temperature of about 50° C. to 125° C.; and said (c) decomposition step is conducted at a temperature of about 200° C. to 600° C.

4. A process according to claim 3 wherein the resulting catalyst contains about 0.1 to 1 weight percent total of platinum-group metal and rhenium.

5. A process according to claim 3 wherein said aqueous solution of said platinum-group metal sulfite contains about 0.001 molar to saturated relative to platinum-group metal sulfite.

6. A process according to claim 3 wherein said porous support is selected from the aluminas, titania, zirconia, magnesia, thoria, chromia, zinc titanate, zinc aluminate, and $SnO/ZnAl_2O_4$.

7. A process according to claim 6 wherein said support is $SnO/ZnAl_2O_4$, said platinum-group metal is platinum, and said platinum-group metal sulfite is hexammonium platinum tetrasulfite.

8. A process according to claim 1, comprising the preliminary step of prewetting with water said porous support effective to substantially saturate with water the pores of said porous support and thereafter (a) contacting with said aqueous solution of said platinum metal sulfite and rhenium compound.

9. A process according to claim 5 wherein said (c) decomposition step is conducted in an oxygen-containing atmosphere and the resulting supported platinum-group metal catalyst is (d) subsequently treated with hydrogen at elevated temperatures.

10. A process according to claim 1 wherein said alkane is an alkane of $C_3$ to $C_{10}$, wherein said catalyst contains about 0.0001 to 10 weight percent total platinum-group metal and rhenium, and said support is selected from the group consisting of aluminas, titania, zirconia, magnesia, thoria, chromia, zinc titanate, zinc aluminate, and $SnO/ZnAl_2O_4$.

11. A process of claim 10 wherein said supported platinum-group metal catalyst contains said rhenium up to an amount equal to one-half the total amount of platinum-group metal and rhenium present.

12. A process of claim 11 wherein in said supported platinum-group metal catalyst said platinum-group metal and rhenium content is in the range of about 0.1 to 1 weight percent.

13. A process according to claim 10 further comprising pre-soaking said porous support in water, methanol, isopropanol, ethylene glycol, or mixture thereof, prior to contacting said platinum-group metal sulfite and rhenium compound solution.

14. A process of claim 10 wherein said alkane is a $C_4$ or $C_5$ alkane.

15. A process according to claim 10 wherein said alkane is n-butane and said dehydrogenation conditions include contacting said n-butane with said supported platinum-group metal catalyst at temperatures in the range of about 480° C. to 650° C., pressures in the range of about 0 to 300 psig, hydrocarbon feed rates of about 100 to 10,000 GHSV gaseous feed per volume of catalyst per hour, and steam at a steam:hydrocarbon mole ratio of about 2:30.

16. A process according to claim 15 wherein said supported noble platinum-group metal is platinum.

17. A process according to claim 16 wherein said support is a tin oxide zinc alumina spinel support.

18. A process according to claim 15 further comprising pre-soaking said support in water, methanol, isopropanol, ethylene glycol, or mixture thereof, prior to contacting said platinum-group metal sulfite and rhenium compound solution.

19. A process of alkane dehydrogenation which comprises contacting at least one alkane under dehydrogenation conditions with a supported platinum-group metal catalyst wherein said platinum-group metal is substantially deposited at the surface of said support and said supported catalyst is prepared by the steps which comprise:

(a) soaking a porous support in water, methanol, isopropanol, ethylene glycol, or mixture thereof, effective to substantially pre-wet the pores of said porous support;

(b) impregnating said pre-wetted porous support with an aqueous solution of a platinum-group metal sulfite, wherein said platinum-group metal is at least one of platinum, iridium, osmium, palladium, rhodium, and ruthenium;

(c) drying the thus-prepared composite; and (d) heating the thus-dried composite to a temperature sufficient to decompose said sulfite, thereby preparing said supported platinum-group metal catalyst wherein said platinum-group metal is substantially deposited at the surface of said support.

20. A process according to claim 19 wherein said supported platinum-group metal catalyst further contains a rhenium compound.

21. A process according to claim 19 wherein said platinum-group metal sulfite is represented by the formula $A_6M(SO_3)_4$, A is ammonium or a member of Group IA of the Periodic Table, and M is a said platinum-group metal; said (b) impregnating step is conducted by treating the said pre-wetted porous support with an aqueous solution of said platinum-group metal sulfite and rhenium compound where employed at temperatures in the range of about 10° C. to 50° C., for a time of about 1 to 1000 seconds, employing a concentration of aqueous solution of said platinum-group metal sulfite sufficient to achieve about 0.0001 to 10 weight percent said platinum-group metal including rhenium where employed in the resulting supported platinum-group metal catalyst; said (c) drying is conducted at a temperature in the range of about 50° C. to 125° C.; and said (d) decomposition step is conducted at a temperature of about 200° C. to 600° C.

22. A process according to claim 21 wherein said catalyst contains about 0.1 to 1 weight percent platinum-group metal including rhenium where employed.

23. A process according to claim 22 wherein said porous support is selected from the aluminas, titania, zirconia, magnesia, thoria, chromia, zinc titanate, zinc aluminate, and SnO/ZnAl$_2$O$_4$.

24. A process according to claim 23 wherein said support is said SnO/ZnAl$_2$O$_4$, said noble platinum-group metal is platinum, and said platinum-group metal sulfite is hexammonium platinum tetrasulfite.

25. A process according to claim 21 wherein said (d) decomposition step is conducted in an oxygen-containing atmosphere and the resulting supported platinum-group metal catalyst is subsequently (e) treated with hydrogen at elevated temperatures.

26. A process according to claim 24 wherein said alkane is butane.

27. A process according to claim 24 wherein said SnO/ZnAl$_2$O$_4$ supported platinum metal catalyst further contains said rhenium up to an amount equal to one-half the total amount of platinum-group metal and rhenium present.

28. A process according to claim 26 wherein in said SnO/ZnAl$_2$O$_4$ supported platinum-group metal catalyst the total of said platinum-group metal and rhenium where employed is in the range of about 0.1 to 1 weight percent.

* * * * *

UNITED STATES PATENT AND TRADEMARK OFFICE
CERTIFICATE OF CORRECTION

PATENT NO. : 4,520,223

DATED : May 28, 1985

INVENTOR(S) : Roger N. McGinnis, Lewis E. Drehman, and Emory W. Pitzer

It is certified that error appears in the above-identified patent and that said Letters Patent is hereby corrected as shown below:

Column 8, claim 23, line 1, "22" should read --- 21 ---.

Signed and Sealed this

Tenth Day of June 1986

[SEAL]

Attest:

DONALD J. QUIGG

Attesting Officer

Commissioner of Patents and Trademarks